(12) United States Patent
Liu et al.

(10) Patent No.: US 11,163,204 B2
(45) Date of Patent: Nov. 2, 2021

(54) ARRAY SUBSTRATE, DISPLAY PANEL INCLUDING THE SAME, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Hong Liu, Beijing (CN); Yezhou Fang, Beijing (CN); Fengguo Wang, Beijing (CN); Xinguo Wu, Beijing (CN); Zhixuan Guo, Beijing (CN); Haidong Wang, Beijing (CN); Liang Tian, Beijing (CN); Kai Li, Beijing (CN); Bo Ma, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/811,122

(22) Filed: Mar. 6, 2020

(65) Prior Publication Data
US 2021/0157185 A1    May 27, 2021

(30) Foreign Application Priority Data
Nov. 22, 2019  (CN) .......................... 201922049821.5

(51) Int. Cl.
*G02F 1/1362* (2006.01)
*G02F 1/1333* (2006.01)
*G02F 1/1343* (2006.01)

(52) U.S. Cl.
CPC .. *G02F 1/136227* (2013.01); *G02F 1/133345* (2013.01); *G02F 1/133357* (2021.01); *G02F 1/134372* (2021.01); *G02F 2203/21* (2013.01)

(58) Field of Classification Search
CPC ................................................ G02F 1/136227
See application file for complete search history.

(56) References Cited

U.S. PATENT DOCUMENTS

| 2015/0287747 A1* | 10/2015 | Cheng ............... G02F 1/133305 257/72 |
| 2017/0329444 A1* | 11/2017 | Hwang ............. G02F 1/133512 |

(Continued)

FOREIGN PATENT DOCUMENTS

WO    WO-2018157601 A1 *  9/2018   ....... G02F 1/136227

*Primary Examiner* — Alexander P Gross
(74) *Attorney, Agent, or Firm* — Leason Ellis LLP

(57) ABSTRACT

An array substrate, a display panel including the same, and a display device are provided. The array substrate includes: a base substrate and a planarization layer on the base substrate. A first conductive layer is disposed on a side of the planarization layer away from the base substrate. A first passivation layer is disposed on a side of the first conductive layer and the side of the planarization layer not being covered by the first conductive layer, away from the base substrate, and provided with a plurality of stress release openings. An insulating layer is disposed in the stress release openings and on a side of the first passivation layer away from the planarization layer. A second conductive layer is disposed on a side of the insulating layer away from the planarization layer.

14 Claims, 4 Drawing Sheets

(56) References Cited

U.S. PATENT DOCUMENTS

| | | | |
|---|---|---|---|
| 2018/0102379 A1* | 4/2018 | Gan | H01L 21/77 |
| 2018/0374955 A1* | 12/2018 | Yoshida | H01L 29/7869 |
| 2019/0179440 A1* | 6/2019 | Beak | G06F 3/04164 |
| 2020/0285124 A1* | 9/2020 | Duan | H01L 21/0273 |

* cited by examiner

ARRAY SUBSTRATE, DISPLAY PANEL INCLUDING THE SAME, AND DISPLAY DEVICE

CROSS-REFERENCE TO RELATED APPLICATION

This application claims priority to Chinese Patent Application No. 201922049821.5 filed on Nov. 22, 2019, titled "Display Device, Display Panel and Array Substrate", the disclosure of which is hereby incorporated by reference in its entirety.

TECHNICAL FIELD

The embodiments of the present disclosure relate to an array substrate, a display panel including the same, and a display device.

BACKGROUND

Liquid crystal display (LCD) panels are widely used due to excellent characteristics. The working principle is to place liquid crystal molecules between two substrates and apply different electric fields at different positions of the substrates to cause different deflections of the liquid crystal molecules, so as to control the light of a backlight to generate different deflections, thereby making the brightness of the emitted light different to achieve image display.

SUMMARY

Embodiments of the present disclosure provide an array substrate, a display panel including the same and a display device.

At least one embodiment provides an array substrate, comprising: a base substrate; a planarization layer on the base substrate; a first conductive layer on a side of the planarization layer away from the base substrate; a first passivation layer on a side of the first conductive layer and the side of the planarization layer not being covered by the first conductive layer away from the base substrate, the first passivation layer being provided with a plurality of openings; an insulating layer in the openings and on a side of the first passivation layer away from the planarization layer; and a second conductive layer on a side of the insulating layer away from the planarization layer.

For example, the array substrate further comprises: a pixel drive circuit layer between the base substrate and the planarization layer, the pixel drive circuit layer including a transistor. The planarization layer includes a first via hole that exposes a first pole of the transistor, a portion of the first passivation layer being disposed in the first via hole. A second via hole is formed in the first passivation layer and exposes the first pole of the transistor, a portion of the insulating layer being disposed in the second via hole. The insulating layer includes a third via hole that exposes the first pole of the transistor, a conductive material being disposed in the third via hole to connect the second conductive layer and the first pole of the transistor.

For example, the insulating layer is an organic material layer.

For example, the array substrate further comprises: a second passivation layer disposed on the side of the insulating layer away from the first passivation layer. The second conductive layer is disposed on the second passivation layer, the second passivation layer having a thickness less than a thickness of the first passivation layer.

For example, the plurality of openings are stress release openings which are uniformly distributed.

For example, each stress release opening has an aperture ranging from about 3 µm to about 5 µm.

For example, at least part of the stress release openings run through an entire thickness of the first passivation layer.

For example, orthographic projections of part of the openings fall within the first conductive layer; orthographic projections of other part of the openings are on the outside of the first conductive layer 13; and the two parts of openings include through holes and semi-through holes.

For example, the plurality of openings are all disposed on the first conductive layer; and all orthographic projections of the plurality of openings fall within the first conductive layer.

For example, the insulating layer has a thickness ranging from about 0.8 µm to about 1.2 µm.

For example, the first conductive layer is one of a pixel electrode or a common electrode, and the second conductive layer is the other one of the pixel electrode or the common electrode.

For example, a first pole of the transistor is one of a source electrode and a drain electrode.

For example, the plurality of openings are stress release openings and are densely distributed at regions with high stress and sparsely distributed at regions with low stress.

At least one embodiment also provides an array substrate, comprising: a base substrate; a gate electrode on the base substrate; a gate insulating layer on the gate electrodes; an active layer on the gate insulating layer, the active layer including a source region, a drain region and a channel region between the source region and the drain region; an interlayer insulating layer between the active layer and the gate insulating layer; source/drain electrodes on two sides of the channel region on the interlayer insulating layer; a planarization layer on the source/drain electrodes and the interlayer insulating layer; a first via hole formed in the planarization layer, corresponding to one of the source/drain electrodes, so as to expose the one of the source/drain electrodes; a first conductive layer on the planarization layer; a first passivation layer on the first conductive layer and provided with a second via hole which is nested with the first via hole; a plurality of openings formed in the first passivation layer, in which one opening is formed in the first via hole; an insulating layer in the first passivation layer and the plurality of openings; a second passivation layer on the insulating layer, in which a third via hole is formed by running through the insulating layer and the second passivation layer and is nested with the second via hole and the first via hole; and a second conductive layer on the second passivation layer.

For example, the plurality of openings are stress release openings which are uniformly distributed; and at least part of the openings run through an entire thickness of the first passivation layer.

For example, orthographic projections of part of the stress release openings fall within the first conductive layer; orthographic projections of other part of the stress release openings are on the outside of the first conductive layer; and both parts of the openings include through holes and semi-through holes.

For example, the plurality of stress release openings are all disposed on the first conductive layer; and all orthographic projections of the plurality of stress release openings fall within the first conductive layer.

For example, the first conductive layer is one of a pixel electrode and a common electrode, and the second conductive layer is the other one of the pixel electrode and the common electrode.

At least one embodiment also provides a display panel, comprising the array substrate.

At least one embodiment also provides display device, comprising the display panel.

BRIEF DESCRIPTION OF THE DRAWINGS

Embodiments of the present disclosure will be described in more detail below with reference to drawings to enable one of ordinary skill in the art understand embodiments of the present disclosure more clearly, in which.

DETAILED DESCRIPTION

Technical solutions of the embodiments will be described in a clearly and fully understandable way in connection with the drawings related to the embodiments of the disclosure. It is apparent that the described embodiments are a part but not all of the embodiments of the disclosure. Based on the described embodiments herein, one of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, 'on,' 'under,' or the like are only used to indicate relative position relationship, and when the absolute position of the object which is described is changed, the relative position relationship may be changed accordingly.

A liquid crystal display (LCD) panel includes a plurality of gate lines and data lines which are intersected. Each gate line and each gate line are intersected to form a pixel unit. The pixel unit includes a pixel drive circuit and a pixel electrode. The pixel drive circuit may include a data write switching transistor and a storage capacitor. A gate electrode of the data write switching transistor is connected with one row of gate lines; a source electrode of the data write switching transistor is connected with one column of data lines; and a drain electrode of the data write switching transistor is connected with the pixel electrode. A first pole plate of the storage capacitor is the pixel electrode, and a second pole plate of the storage capacitor is a common electrode. However, the inventors have found that the phenomenon that some pixel units are not bright often happened in the LCD panel, and the phenomenon that a large number of pixel units are not bright (for example, more than 3% of the pixel units) will seriously affect the product quality.

Figure 1:
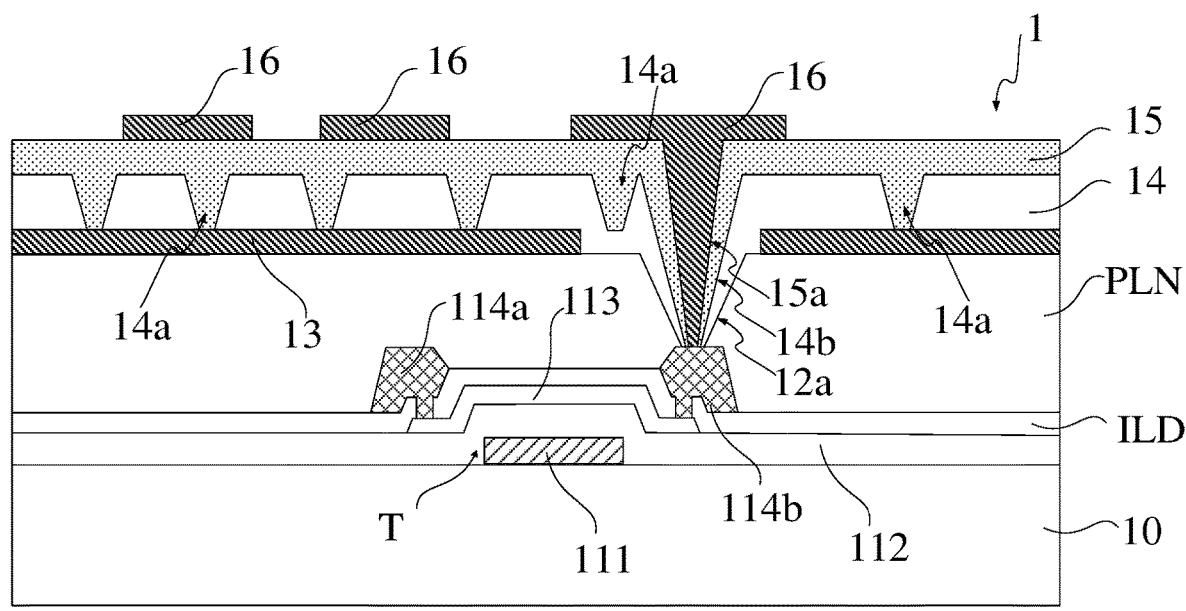
FIG. 1 is a schematically structural sectional view of an array substrate provided by an embodiment of the present disclosure.

FIG. 1 is a schematically structural sectional view of an array substrate provided by an embodiment of the present disclosure.

As shown in FIG. 1, the array substrate 1 comprises: a base substrate 10; a planarization layer PLN disposed on the base substrate 10; a first conductive layer 13 disposed on a side of the planarization layer PLN away from the base substrate 10; a first passivation layer 14 disposed on a side of the first conductive layer 13 and the portion of the planarization layer PLN not being covered by the first conductive layer 13, away from the base substrate 10; a plurality of openings 14a formed in the first passivation layer 14; an insulating layer 15 disposed in the plurality of openings 14a and on a side of the first passivation layer 14 away from the planarization layer PLN; and a second conductive layer 16 disposed on a side of the insulating layer 15 away from the planarization layer PLN.

For instance, the plurality of openings are stress release openings.

The inventors have found that the plurality of stress release openings are formed in the passivation layer to release the stress caused by the expansion and contraction of the passivation layer under high temperature conditions, so that the stress of the passivation layer after the stress is released is matched with the stress of the planarization layer to prevent the passivation layer from cracking and peeling off, so that the quality of the array substrate is improved. In addition, the arrangement of the insulating layer increases the spacing between the two pole plates in the storage capacitor, and decreases the storage capacitance. In this way, the charging time is reduced.

In the embodiment, a pixel drive circuit layer is disposed between the base substrate 10 and the planarization layer PLN, and the pixel drive circuit layer includes a transistor T. The planarization layer PLN is provided with a first via hole 12a that exposes a first pole 114b of the transistor T. A portion of the first passivation layer 14 is disposed in the first via hole 12a. A second via hole 14b is formed in the first passivation layer 14 and exposes the first pole 114b. A portion of the insulating layer 15 is disposed in the second via hole 14b and provided with a third via hole 15a that exposes the first pole 114b. Conductive material is disposed in the third via hole 15a to connect the second conductive layer 16 and the first pole 114b. For instance, the second conductive layer 16 is a pixel electrode, and the first conductive layer 13 is a common electrode.

When the transistor T is a bottom-gate structure, the transistor T may include from bottom to top: a bottom gate 111, a gate insulating layer 112, an active layer 113, an interlayer dielectric layer ILD, a first pole 114b and a second pole 114a. In other words, the first pole 114b may be one of a source electrode or a drain electrode, and the second pole 114a is the other one of the source electrode or the drain electrode. The active layer 113 includes a source region, a drain region, and a channel region disposed between the source region and the drain region. The source electrode is electrically connected with the source region, and the drain electrode is electrically connected with the drain region.

In some embodiments, when the transistor is a top-gate structure, the transistor T may include from bottom to top: an active layer 113, a gate insulating layer 112, a top gate (not shown), an interlayer dielectric layer ILD, a first pole 114b and a second pole 114a.

In some embodiments, the transistor T may be a P-type transistor (PMOS), for example, the transistor T may be a low-temperature polysilicon thin-film transistor (LTPS-TFT), and the material of the active layer 113 is low-temperature polysilicon.

In some embodiments, the transistor T may be an N-type transistor (NMOS), for example, the transistor T may be a low-temperature polysilicon oxide thin-film transistor (LTPO TFT), and the material of the active layer 113 may be at least one of indium gallium zinc oxide (IGZO), indium gallium tin oxide (IGTO), or indium zinc tin oxide (IZTO).

The pixel drive circuit in the embodiment may include a data write switching transistor and a storage capacitor and may also include other transistors and other capacitors. The transistor T may be a data write switching transistor and may also be other transistors. One pole plate of the storage capacitor is the second conductive layer 16, and the other pole plate of the storage capacitor is the first conductive layer 13.

The planarization layer PLN may be made from organic material with good fluidity, such as polyimide, but the embodiment of the present disclosure is not limited thereto.

The material of the first passivation layer 14 may be silicon nitride or the like to isolate moisture. Part of the stress release openings 14a run through the entire thickness of the first passivation layer 14, and part of the stress release openings 14a run into partial thickness of the first passivation layer 14. That is to say, part of the stress release openings 14a expose the first conductive layer 13 or the planarization layer PLN, and part of the stress release openings 14a do not expose the first conductive layer 13 or do not expose the planarization layer PLN.

Figure 2:
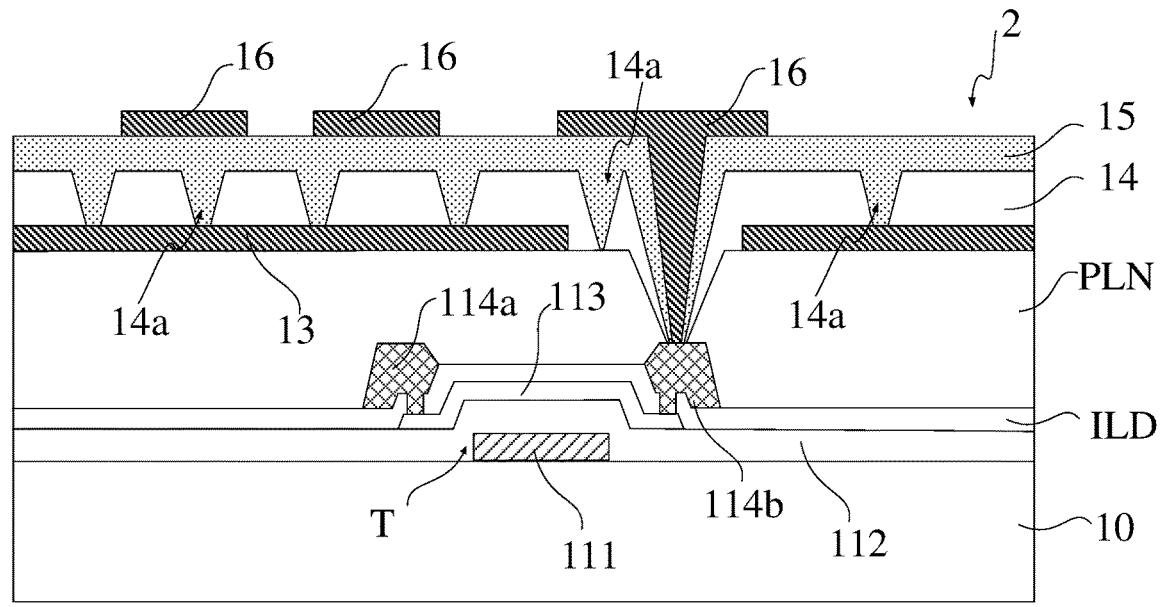
FIG. 2 is a schematically structural sectional view of an array substrate provided by an embodiment of the present disclosure.
Figure 3:
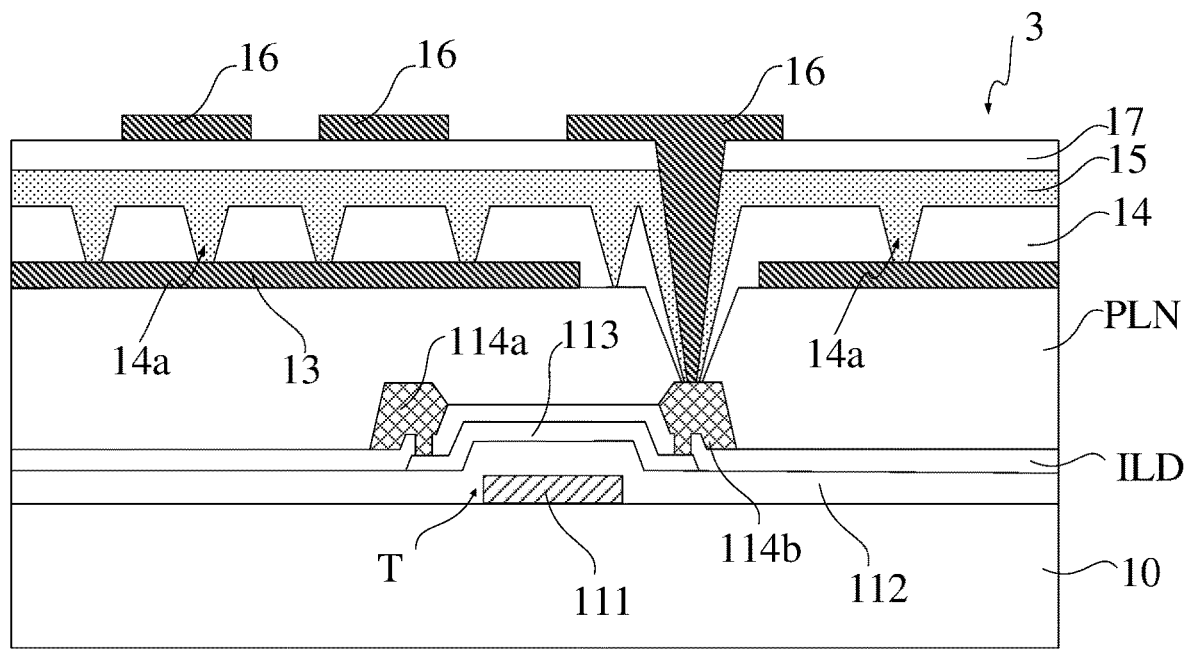
FIG. 3 is a schematically structural sectional view of an array substrate provided by an embodiment of the present disclosure.
Figure 7:
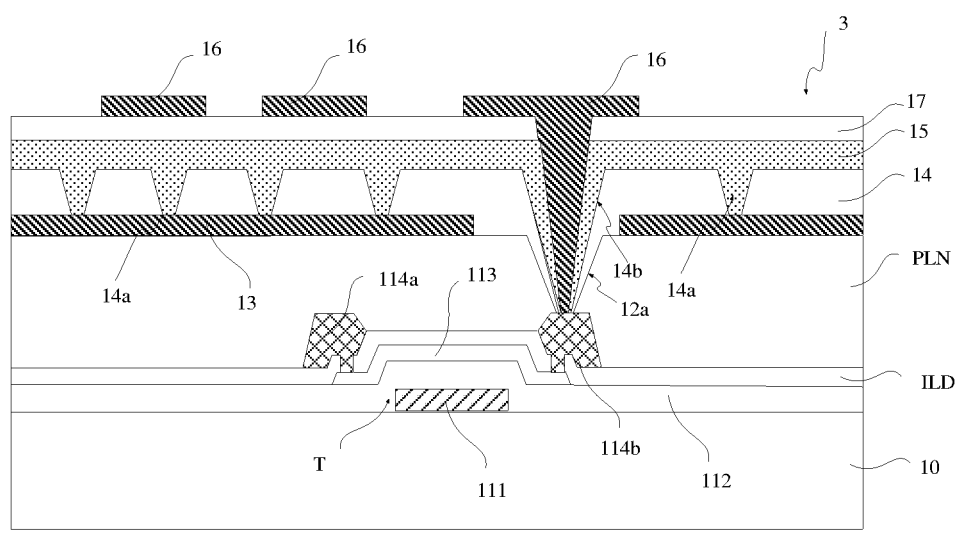
FIG. 7 is a schematically structural sectional view of an array substrate provided by an embodiment of the present disclosure.

For instance, as shown in FIGS. 1-3, orthographic projections of part of openings fall within the first conductive layer 13; orthographic projections of part of openings are on the outside of the first conductive layer 13; and the two parts of openings can include through holes and semi-through holes. Moreover, for instance, as shown in FIG. 7, all the openings are disposed on the first conductive layer 13, namely all the orthographic projections of all the openings fall within the first conductive layer 13, and through holes or semi-through holes may not be designed at positions near the via holes.

In some embodiments, the plurality of stress release openings 14a are uniformly distributed, that is, the spacing between adjacent stress release openings 14a is equal, so as to release the stress evenly in the plane direction of the first passivation layer 14. In some embodiments, the plurality of stress release openings 14a may be densely distributed at regions with high stress and sparsely distributed at regions with low stress.

Illustratively, the aperture range of the stress release opening 14a is about 3 µm to about 5 µm.

"About" or "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" or "approximately" or "substantially" can mean within one or more standard deviations, or within ±30%, 20%, 10%, 5% of the stated value.

In some embodiments, the insulating layer 15 is an organic material layer, and the organic material is, for example, siloxane polymer. The polymer main composition of the siloxane polymer may be (RSiO1.5)n, and R represents a general formula of a hydrocarbon group or an alkyl group. The polymer structure of the siloxane polymer may be trapezoidal, dendritic or lantern-like and has higher heat resistance, insulativity, flatness, and strong step coverage. The organic material layer can avoid a problem that the second conductive layer 16 can be easily stripped off under the action of external force due to large difference between the inside and the outside of the second via hole 14b and thinner and poor coverage of the first passivation layer 14.

In some embodiments, the insulating layer 15 is an inorganic material layer, and the material is, for example, silicon dioxide, silicon nitride, silicon oxynitride, or the like, namely inorganic materials with strong step coverage.

In some embodiments, the insulating layer 15 may be a stack structure of an organic material layer and an inorganic material layer.

Illustratively, the thickness of the insulating layer 15 may range from about 0.8 µm to about 1.2 µm.

In the embodiment, the plurality of stress release openings 14a are formed in the passivation layer 14 to release the stress caused by the expansion and contraction of the passivation layer 14 under high temperature conditions, so that the stress of the passivation layer 14 after the stress is released is matched with the stress of the planarization layer PLN to prevent the passivation layer 14 from cracking and peeling off, for example, preventing the cracking and the peeling of the first passivation layer 14 and the second conductive layer 16 near the second via hole 14b. In this way, the quality of the array substrate 1 is improved. In addition, the arrangement of the insulating layer 15 increases the spacing between the two pole plates of the storage capacitor, and decreases the storage capacitance. In this way, the charging time is decreased.

In some embodiments, the first conductive layer 13 is a pixel electrode, and the second conductive layer 16 is a common electrode.

FIG. 2 is a schematically structural sectional view of an array substrate provided by another embodiment of the present disclosure. As shown in FIG. 2, the array substrate 2 in the embodiment is roughly the same as the array substrate 1 in FIG. 1, while some difference are provided: all the stress release openings 14a run through the entire thickness of the first passivation layer 14 so as to release the stress of the entire thickness of the first passivation layer 14. That is to say, all the stress release openings 14a expose the first conductive layer 13 or the planarization layer PLN.

FIG. 3 is a schematically structural sectional view of an array substrate provided by still another embodiment of the present disclosure. As shown in FIG. 3, the array substrate 3 in the embodiment is roughly the same as the array substrates 1 and 2 in FIGS. 1 and 2, while some difference are provided: the insulating layer 15 is an organic material layer; a second passivation layer 17 is disposed on the organic material layer; a second conductive layer 16 is disposed on the second passivation layer 17; and the thickness of the second passivation layer 17 is less than the thickness of the first passivation layer 14.

The second passivation layer 17 can prevent moisture above (moisture in the liquid crystal layer 30) from entering film layers of the pixel drive circuit layer.

Based on any foregoing array substrate 10, one embodiment of the present disclosure also provides a display panel 100.

Figure 4:
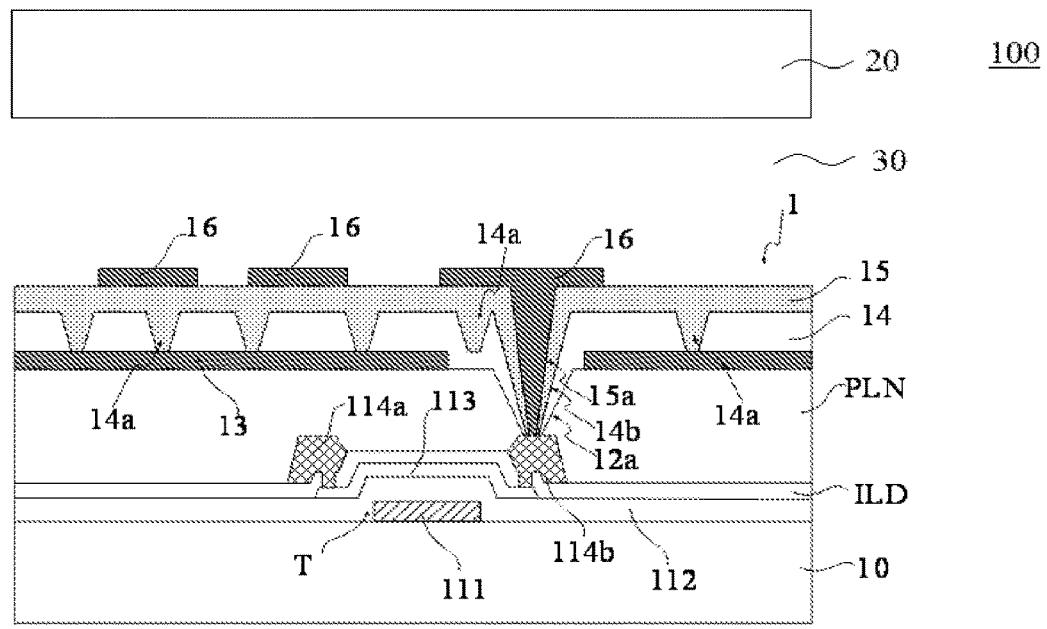
FIG. 4 is a schematically structural sectional view of a display panel provided by an embodiment of the present disclosure.
Figure 5:
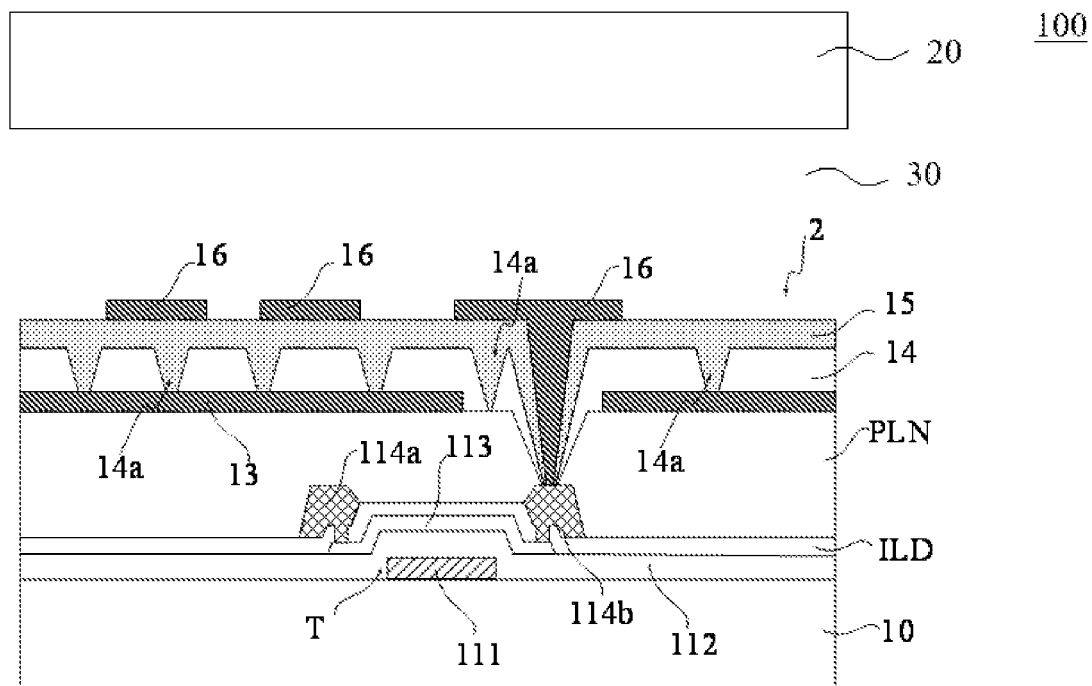
FIG. 5 is a schematically structural sectional view of a display panel provided by an embodiment of the present disclosure.
Figure 6:
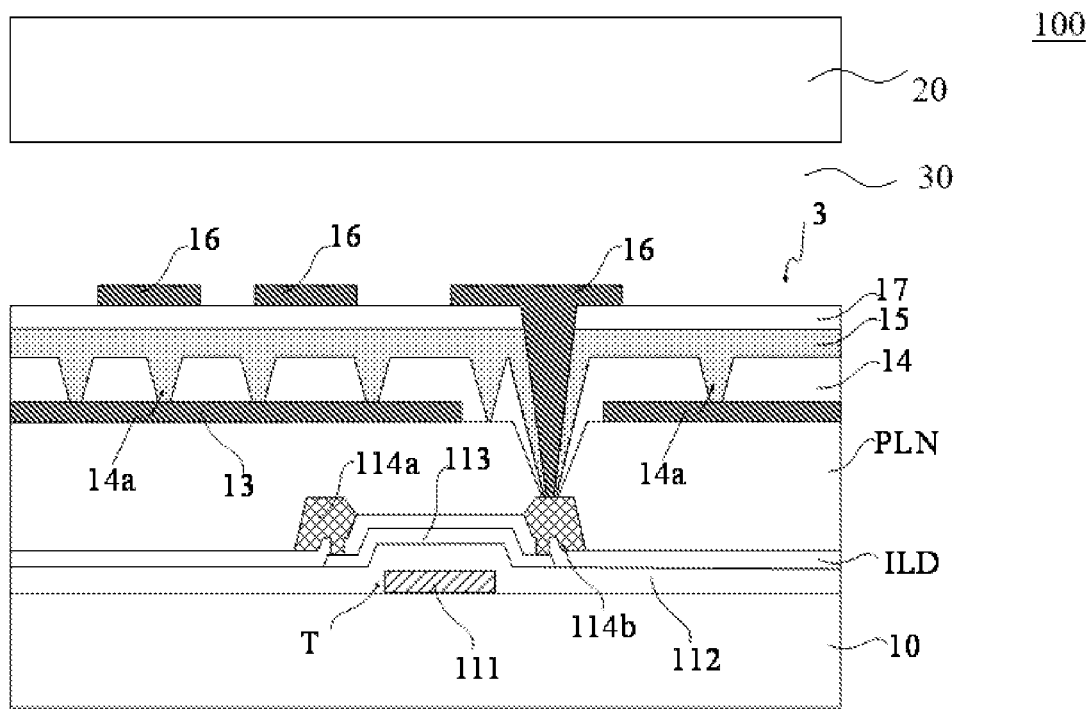
FIG. 6 is a schematically structural sectional view of a display panel provided by an embodiment of the present disclosure.

For instance, as shown in FIGS. 4-6, the display panel 100 comprises: a color filter (CF) substrate 20; any foregoing array substrate 20; and a liquid crystal layer 30 disposed between the CF substrate 20 and the array substrate 10.

Based on the above display panel 100, an embodiment of the present disclosure also provides a display device, which comprises any foregoing display panel 100.

The display device may be any product or component with display function, such as e-paper, a mobile phone, a tablet PC, a TV, a notebook computer, a digital album, or a navigator.

It is to be noted that, in the drawings, the dimension of layers and regions may be exaggerated for clarity of illustration. It is also to be understood that when an element or layer is referred to as being "on" another element or layer, it can be directly on the other element or an interlayer may be present. In addition, it is to be understood that when an element or layer is referred to as being "under" another element or layer, it can be directly under the other element or more than one interlayers or elements may be present. In addition, it is also to be understood that when a layer or an element is referred to as being "between" two layers or two elements, it can be the only layer between the two layers or the two elements, or more than one interlayers or elements may be present between the two layers or the two elements. Similar reference numerals in the whole text indicate similar elements.

The following statements should be noted:

(1) The accompanying drawings involve only the structure(s) in connection with the embodiment(s) of the present disclosure, and other structure(s) can be referred to common design(s).

(2) For the purpose of clarity only, in the accompanying drawings for illustrating the embodiment(s) of the present disclosure, the thickness of a layer or a region may be enlarged or reduced, that is to say, the figures are not drawn according to the actual scale.

(3) Without conflicting with each other, the embodiments of the present disclosure and elements in the embodiments can be combined to obtain new embodiments, and these new embodiments shall fall within the scope of the present disclosure.

The description above is only exemplary embodiments of the present disclosure, and the scope of the present disclosure is not limited thereto. Any changes or substitutions readily conceived by one of ordinary skill in the art without departing the technical scope of the present embodiments, shall fall within the scope of the present disclosure.

What is claimed is:

1. An array substrate, comprising:
    a base substrate;
    a planarization layer on the base substrate;
    a first conductive layer on a side of the planarization layer away from the base substrate;
    a first passivation layer on a side of the first conductive layer and the side of the planarization layer not being covered by the first conductive layer away from the base substrate, the first passivation layer being provided with a plurality of openings;
    an insulating layer in the openings and on a side of the first passivation layer away from the planarization layer; and
    a second conductive layer on a side of the insulating layer away from the planarization layer,
    wherein the plurality of openings are stress release openings which are uniformly distributed, orthographic projections of at least part of the stress release openings fall within the first conductive layer; and the stress release openings include through holes and semi-through holes.

2. The array substrate according to claim 1, wherein the plurality of openings are all disposed on the first conductive layer; and all orthographic projections of the plurality of openings fall within the first conductive layer.

3. The array substrate according to claim 1, wherein the insulating layer has a thickness ranging from about 0.8 µm to about 1.2 µm.

4. The array substrate according to claim 1, wherein the first conductive layer is one of a pixel electrode or a common electrode, and the second conductive layer is the other one of the pixel electrode or the common electrode.

5. The array substrate according to claim 1, further comprising: a pixel drive circuit layer between the base substrate and the planarization layer, the pixel drive circuit layer including a transistor, wherein the planarization layer includes a first via hole that exposes a first pole of the transistor, a portion of the first passivation layer being disposed in the first via hole; a second via hole is formed in the first passivation layer and exposes the first pole of the transistor, a portion of the insulating layer being disposed in the second via hole; and the insulating layer includes a third via hole that exposes the first pole of the transistor, a conductive material being disposed in the third via hole to connect the second conductive layer and the first pole of the transistor.

6. The array substrate according to claim 1, wherein the insulating layer is an organic material layer.

7. The array substrate according to claim 1, further comprising: a second passivation layer disposed on the side of the insulating layer away from the first passivation layer, wherein the second conductive layer is disposed on the second passivation layer, the second passivation layer having a thickness less than a thickness of the first passivation layer.

8. The array substrate according to claim 1, wherein each stress release opening has an aperture ranging from about 3 µm to about 5 µm.

9. The array substrate according to claim 1, wherein at least part of the stress release openings run through an entire thickness of the first passivation layer.

10. An array substrate, comprising:
    a base substrate;
    a gate electrode on the base substrate;
    a gate insulating layer on the gate electrodes;
    an active layer on the gate insulating layer, the active layer including a source region, a drain region and a channel region between the source region and the drain region;
    an interlayer insulating layer on the active layer and the gate insulating layer;
    source/drain electrodes on two sides of the channel region on the interlayer insulating layer;
    a planarization layer on the source/drain electrodes and the interlayer insulating layer;
    a first via hole formed in the planarization layer, corresponding to one of the source/drain electrodes, so as to expose the one of the source/drain electrodes;

a first conductive layer on the planarization layer;

a first passivation layer on the first conductive layer and provided with a second via hole which is nested with the first via hole;

a plurality of openings formed in the first passivation layer, in which one of the plurality of openings is the second via hole and is formed in the first via hole;

an insulating layer formed in the plurality of openings formed in the first passivation layer;

a second passivation layer on the insulating layer, in which a third via hole is formed by running through the insulating layer and the second passivation layer and is nested with the second via hole and the first via hole; and a second conductive layer on the second passivation layer; wherein the plurality of openings are stress release openings which are uniformly distributed; and at least part of the openings run through an entire thickness of the first passivation layer; orthographic projections of the at least part of the stress release openings fall within the first conductive layer; and the stress release openings include through holes and semi-through holes.

11. The array substrate according to claim 10, wherein a part of the plurality of stress release openings are all disposed on the first conductive layer; and all orthographic projections of the part of the plurality of stress release openings fall within the first conductive layer.

12. The array substrate according to claim 10, wherein the first conductive layer is one of a pixel electrode and a common electrode, and the second conductive layer is the other one of the pixel electrode and the common electrode.

13. A display panel, comprising an array substrate, wherein the array substrate comprises, a base substrate;

a planarization layer on the base substrate;

a first conductive layer on a side of the planarization layer away from the base substrate;

a first passivation layer on a side of the first conductive layer and the side of the planarization layer not being covered by the first conductive layer away from the base substrate, the first passivation layer being provided with a plurality of openings;

an insulating layer in the openings and on a side of the first passivation layer away from the planarization layer; and a second conductive layer on a side of the insulating layer away from the planarization layer, wherein the plurality of openings are stress release openings which are uniformly distributed, orthographic projections of part of the stress release openings fall within the first conductive layer;

orthographic projections of other part of the stress release openings are on the outside of the first conductive layer; and the two parts of stress release openings include through holes and semi-through holes.

14. A display device, comprising the display panel according to claim 13.

* * * * *